United States Patent [19]

Shibata et al.

[11] Patent Number: 4,927,877
[45] Date of Patent: May 22, 1990

[54] AIR-DRYING NON-WATER-DISPERSIBLE RESIN COMPOSITION

[75] Inventors: Terukazu Shibata, Yokohama; Nobushige Numa, Ebina; Masafumi Kawamura, Hiratsuka, all of Japan

[73] Assignee: Kansai Paint Co., Ltd., Hyogo, Japan

[21] Appl. No.: 334,550

[22] Filed: Apr. 7, 1989

[30] Foreign Application Priority Data

Apr. 12, 1988 [JP] Japan ................................. 63-89352

[51] Int. Cl.$^5$ ............................................ C08L 67/08
[52] U.S. Cl. ..................... 525/7; 525/167.5; 525/444.5; 525/445; 523/522
[58] Field of Search ............. 525/7, 167.5, 445, 444.5; 523/522

[56] References Cited

U.S. PATENT DOCUMENTS 4,133,785 1/1979 Henshaw ................................. 525/7

*Primary Examiner*—Patricia Short
*Attorney, Agent, or Firm*—Wenderoth, Lind & Ponack

[57] ABSTRACT

An air-drying non-water-dispersible resin composition obtained by dispersion-polymerization of at least one vinyllic unsaturated monomer (C) in the presence of a vinyllic graft alkyd resin (I) as a dispersion stabilizer in an organic solvent in which at least a part of the vinyllic graft alkyd resin (I) is soluble, the vinyllic unsaturated monomer (C) is substantially soluble but the resulting polymer gels are substantially insoluble, wherein the vinyllic graft alkyd resin (I) is obtained by graft copolymerizing 10 to 70% by weight of a modified alkyd resin (A) having an oil length in the range of 30 to 80% obtained by modification with at least one material selected from drying oils, semi-drying oils, drying oil fatty acids and semi-drying oil fatty acids with 90 to 30% by weight of at least one vinyllic monomer (B) at least 30% of the vinyl monomer (B) being composed of a vinyllic unsaturated monomer (B-1) having an SP value of not greater than 8.25 and a glass transition temperature of at least 20° C.

15 Claims, No Drawings

AIR-DRYING NON-WATER-DISPERSIBLE RESIN COMPOSITION

This invention relates to a non-water-dispersible resin composition, and more specifically, to an air-drying non-water-dispersible resin composition containing water-insoluble polymer gel particles obtained by dispersion-polymerization of a vinyllic unsaturated monomer in the presence of a specific vinyllic graft alkyd resin as a dispersion stabilizer.

Alkyd resins, acrylic resins and acrylic graft alkyd resins are among the known air-drying paint resins and are used for painting steel structures, bridges, buildings and industrial machinery. In recent years in order to save resources and control atmospheric pollution, it has been desired to prepare paints of high solids concentrations. It has also been desired to improve various paint properties such as coatability, drying propery, gloss and weatherability.

With this background, air-drying non-waterdispersible resins were developed, and some works have been reported. For example, there were proposed a mixture of a non-water dispersible polymer and an alkyd resin with a dispersion stabilizer composed of an alkyd resin modified with a drying oil or a drying oil fatty acid (Japanese Laid-Open Patent Publication No. 213059/1983) and a mixture of a non-water-dispersible polymer and an alkyd resin with a dispersion stabilizer composed of a drying oil fatty acid-modified acrylic resin (Japanese Laid-Open Patent Publication No. 199777/1984). These mixtures are not entirely satisfactory because they have no sufficient storage stability or mechanical stability, or it is difficult to balance their gloss, drying property, film hardness and other film properties.

In the case of an oxidative polymerization-type air drying paint composition generally forming a dry film by volatilization of an organic solvent and oxidative polymerization, it is the usual practice to coat it in multilayers in order to obtain the required film appearance. If in the multicoat coating of this coating composition, the coating composition is applied for the second time before the film formed for the first time dries completely by oxidative polymerization, the amount of oxygen supplied to the first film decreases. Hence, the inside of the coated film is in the uncured state, and the entire film system has degraded properties. Or the surface of the film formed for the first time is dissolved or swollen by the paint composition overcoated on it, and the surface of the finally formed film has defects such as wrinkling to present a poor finish. Accordingly, each coating operation requires sufficient drying, and the entire coating operation has an inferior efficiency.

In addition to the above oxidative-polymerization type air drying paints, lacquer type paints such as acrylic lacquers and nitrocellulose lacquers capable of forming a film only by the evaporation of organic solvents are used as air drying paints. The lacquer type paints does not have such film defects as wrinkling which are seen in the oxidative-polymerization type paints in multicoat coating. But the resulting films have poor durability since no cured film is formed.

The present inventors make extensive investigations in order to improve the stability and the balance among gloss, drying property, film hardness and other film properties of the conventional air drying non-waterdispersible resin and increase the efficiency of coating these resins. Consequently, they found that the above purpose can be achieved by an air-drying non-waterdispersible resin composition comprising a specific vinyllic graft alkyd resin as a dispersion stabilizer and a polymer of a vinyllic unsaturated monomer as gel particles in an organic solvent, in which the dispersion stabilizer is at least partly soluble and the polymer gel particles are dispersed stably. This finding has led to the present invention.

According to this invention, there is provided an air-drying non-water-dispersible resin composition obtained by dispersion-polymerization of at least one vinyllic unsaturated monomer (C) in the presence of a vinyllic graft alkyd resin (I) as a dispersion stabilizer in an organic solvent in which at least a part of the vinyllic graft alkyd resin (I) is soluble, the vinyllic unsaturated monomer (C) is substantially soluble but the resulting polymer cells are substantially insoluble, wherein the vinyllic graft alkyd resin (I) is obtained by graft copolymerizing 10 to 70% by weight of a modified alkyd resin (A) having an oil length in the range of 30 to 80% obtained by modification with at least one modifier selected from drying oils, semi-drying oils, drying oil fatty acids and semi-drying oil fatty acids with 90 to 30% by weight of at least one vinyllic monomer (B) at least 30% of the vinyl monomer (B) being composed of a vinyllic unsaturated monomer (B-1) having an SP value of not greater than 8.25 and a glass transition temperature of at least 20° C.

The air-drying non-water-dispersible resin composition of this invention will be described below in detail.

The vinyllic graft alkyd resin (I) used to prepare the resin composition of this invention is obtained by graft-copolymerizing the modified alkyl resin (A) having an oil length of 30 to 80% and obtained by modification with at least one modifier selected from drying oils, semi-drying oils, drying oil fatty acids and semi-drying oil fatty acids with at least one vinyllic monomer (B).

The modified alkyd resin (A) used as a trunk polymer in the above graft copolymerization preferably contains an alicyclic hydrocarbon ring. It can be produced by reacting a polybasic acid compound containing an alicyclic hydrocarbon ring having 1 or 2 hydrogen atoms bonded to at least one hydrogen atom constituting the alicyclic hydrocarbon ring (to be referred to as the alicyclic polybasic acid") and/or a polyhydric alcohol containing the alicyclic hydrocarbon ring (to be referred to as the "alicyclic polyhydric alcohol") as an acid component and/or an alcohol component in accordance with the method of producing the alicyclic modified alkyd resin optionally in combination with monobasic compounds, other polybasic acid compounds and/or other polyhydric alcohols. For example, the above reaction can be carried out by charging all of the acid component and the alcohol component into a reactor; or by first reacting the (semi-)drying oil (fatty acid) and the polyhydric alcohol to form a monoglyceride, and then reacting it with the acid component; or by reacting all starting materials except the (semi-)drying oil (fatty acid) to form a hydroxylcontaining alkyd resin, and then reacting it with the (semi-)drying oil (fatty acid). The method of producing the fatty acid modified alkyd resin is described in detail, for example, in D. H. Solomon, "The Chemistry of Organic Film Formers"(1967, John Wiley & Sons, Inc.). Accordingly, the description of this book is cited herein in lieu of a description of the method of producing modified alkyd resin used in this invention.

The alicyclic hydrocarbon ring contained in the alicyclic polybasic acid and the alicyclic polyhydric alcohol that can be used in the production of the (semi-)drying oil (fatty acid)-modified alkyd resin containing an alicyclic hydrocarbon ring can be a grafting site of graft-copolymerizing the vinyllic monomer (B) in the next step. The alicyclic hydrocarbon ring may be any alicyclic hydrocarbon ring having 1 or 2 hydrogen atoms bonded to at least one hydrogen atom constituting the ring. It may be of a small ring member of 3 to a 7-membered or larger membered. The ring may be partially unsaturated (for example, containing 1 or 2 double bond), or polycyclic. In particular, 5- or 6-membered alicyclic hydrocarbon rings are preferred. Specific examples of the alicyclic polybasic acid are shown below.

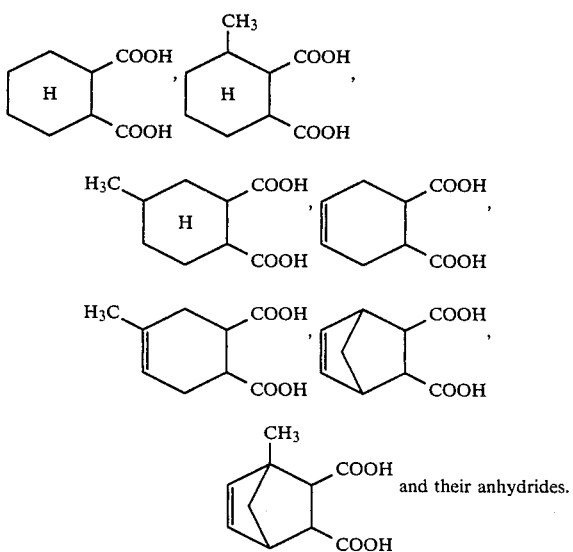

Examples of the alicyclic polyhydric alcohol are as follows:

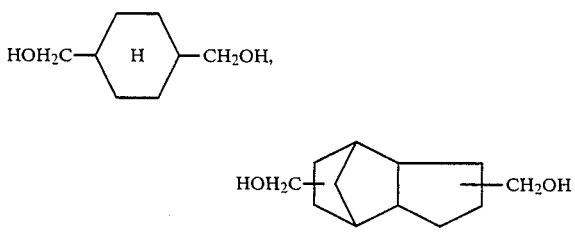

and hydrogenation products of bisphenols.

Conveniently, the alicyclic polybasic acid and/or the alicyclic polyhydric alcohol is used in an amount of generally 1 to 30% by weight, preferably 2 to 15% by weight, based on the total amount of the starting materials for the modified alkyd resin.

The (semi-)drying oil (fatty acids) used as the modifier include any (semi-)drying oil (fatty acids) usually employed in modifying alkyd resins, specifically drying oils such as linseed oil, tung oil, oiticica oil, perilla oil, sunflower oil, hemp-seed oil, poppy-seed oil, or their fatty acids; semi-drying oil such as dehydrated castor oil, tall oil, soybean oil, sufflower oil, rice bran oil, cotton seed oil, sesame oil, rapeseed oil, corn oil and mustard oil or their fatty acids.

Polybasic acid compounds, monobasic acid compounds and polyhydric alcohols may be those which are usually employed in the production of paint alkyd resins. Specific examples of the other polybasic acid compounds are phthalic acid, phthalic anhydride, isophthalic acid, terephthalic acid, dimethylisophthalic acid, adipic acid, maleic acid, maleic anhydride, azelaic acid, succinic acid, succinic anhydride, trimellitic acid and pelargonic acid. Specific examples of the monobasic acid compounds are benzoic acid and p-t-butylbenzoic acid. Specific examples of the other polyhydric alcohols include ethylene glycol, propylene glycol, diethylene glycol, triethylene glycol, butylene glycol 1,1,5-pentanediol, neopentyl glycol, 1,6-hexanediol, 2,5-hexanediol, 2,2,4-trimethyl1,3-pentanediol, dipropylene glycol, trimethylolethane, trimethylolpropane, glycerol, diglycerol and pentaerythritol.

The modified alkyd resin (A) obtained by using the acid component, alcohol component and (semi-)drying oil (fatty acid) described above has an oil length of 30 to 80% by weight, preferably 50 to 70%, more preferably 55 to 68%. The "oil length", as used herein, denotes the content of the fatty oil or fatty acid in the modified alkyd resin.

The modified alkyd resin (A) may have a number average molecular weight of generally 500 to 200,000, preferably 800 to 80.000.

At least 30% by weight, preferably at least 50% by weight, especially preferably 55 to 95% by weight of the vinyllic monomer (B) to be graft polymerized with the modified alkyd resin (A) is composed of a vinyllic unsaturated monomer (B-1) having an SP value of not greater than 8.25, preferably not greater than 8.15, more preferably 7.80 to 8.15, and a glass transition temperature (Tg) of at least 20° C., preferably at least 50° C., and more preferably 51° to 150° C., and the remainder being one or more of other vinyllic unsaturated monomer (B-2).

The "SP value", as used herein, is described in J. Brandrup, E. H. Imnergut, "Polymer Handbook", Interscience (1974) or K. L. Hoy, J. Paint Tech., 42[541], 176, 1970.

Specific examples of the vinyllic unsaturated monomer (B-1) are isobutyl methacrylate and tert-butyl methacrylate.

Examples of the monomer (B-2) that can be used in combination with the monomer (B-1) include vinyl aromatic compounds such as styrene, alpha-methylstyrene and vinyltoluene; $C_1-C_{12}$ alkyl esters of (meth)acrylic acid such as methyl (meth)acrylate, n-butyl (meth)acrylate, isobutyl acrylate, tert-butyl acrylate and 2-ethylhexyl (meth)acrylate; $C_1-C_6$ hydroxyalkyl esters of (meth)acrylic acid such as 2-hydroxyethyl(meth)acrylate and hydroxypropyl (meth)acrylate; glycidyl (meth)acrylate; alpha,beta-ethylenically unsaturated carboxylic acid such as (meth)acrylic acid and maleic acid; (meth)acrylonitrile; (meth)acrylamide; and vinyl acetate. These monomers may be used singly or in combination with each other.

The graft polymerization of the vinyllic monomer (B) with the modified alkyd resin (A) may be carried out, for example, by polymerizing the modified alkyd resin (A) and the vinyllic monomer (B) in the presence of a radical polymerization initiator in an organic solvent. The proportions of the vinyllic monomer (B) and the modified alkyd resin (A) are 10 to 70% by weight, preferably 12 to 65% by weight, more preferably 15 to 50% by weight, for the modified alkyd resin (A) and 90 to 30% by weight, preferably 88 to 35% by weight, more preferably 85 to 50% by weight, for the vinyllic monomer.

Preferred radical polymerization initiators include, for example, initiators of the peroxide type such as benzoyl peroxide, di-t-butyl peroxide, cumene hydroperoxide, t-butylperoxy-2-ethylhexanoate and t-butylperoxybenzoate.

Examples of the organic solvent include mineral spirits (mixed organic solvents of the petroleum-type hydrocarbons composed of aliphatic cyclic saturated or aromatic hydrocarbons) and aliphatic hydrocarbons such as hexane, heptane and octane; hydrocarbon mixtures such as petroleum benzin, ligroin, petroleum naphtha and kerosene; alicyclic hydrocarbons such as cyclohexane, methylcyclohexane and ethylcyclohexane; aromatic hydrocarbons such as xylene and toluene ketones such as acetone, methyl ethyl ketone and methyl isobutyl ketone; alcohols such as methanol, ethanol, isopropanol and butanol; and esters such as ethyl acetate, propyl acetate and butyl acetate. These organic solvents may be used singly or in combination with each other. Organic solvents containing mineral spirits as main components are preferred.

The graft polymerization can be carried out usually at a temperature of about 50° to about 150° C. under atmospheric pressure by known graft polymerization methods.

The vinyllic graft alkyd resin (I) may also be obtained by a method which comprises graft-polymerizing the vinyllic monomer in the presence of a reaction product having a radical polymerizable functional group obtained by reacting a (semi-)drying oil (fatty acid)-modified alkyd resin and glycidyl (meth)acrylate or a hydroxyalkyl (meth)acrylate or a method which comprises reacting a vinyllic copolymer containing a glycidyl or hydroxyl group and a carboxyl-containing (semi-)drying oil (fatty acid)-modified alkyd resin.

The resulting vinyllic graft alkyd resin (I) may generally have a number average molecular weight of 3,000 to 300,000, preferably 9,000 to 100,000. It may be liquid or solid, desirably the latter.

The non-water-dispersible resin composition of this invention can be produced by dispersion-polymerizing at least one vinyllic unsaturated monomer (C) in the presence of the vinyllic graft alkyd resin (I) as a dispersion stabilizer in the organic solvent. The vinyllic unsaturated monomer polymerizes to form dispersed insoluble polymer gel particles.

The vinyllic unsaturated monomer (C) is used generally in an amount of 25 to 900 parts by weight, preferably 40 to 400 parts by weight, more preferably 50 to 300 parts by weight, per 100 parts by weight of the vinyllic graft alkyd resin (I).

In order that the vinyllic unsaturated monomer (C) may crosslink simultaneously and/or after the polymerization to form insoluble dispersed gel particles, at least a part of it must be a monomer having a crosslinkable functional group in addition to a unsaturated bond contributing to the polymerization. The unsaturated monomer having such a crosslinkable functional group a combination of a vinyllic unsaturated monomer having a glycidyl group and a vinyllic unsaturated monomer having a carboxyl group. If the amount of the unsaturated monomer having a crosslinkable functional group is too small, sufficiently gelled dispersed particles cannot be obtained. If it is too large, the entire system is gelled or thickened during the dispersion polymerization. Generally, the unsaturated monomer having a crosslinkable functional group is used conveniently in an amount of 1 to 20% by weight, preferably 1.5 to 15% by weight, more preferably 2 to 10% by weight, based on the total amount of the vinyllic unsaturated monomer (C), the remainder being an ordinary vinyllic unsaturated monomer having no crosslinkable functional group.

Examples of the polyfunctional monomer include diethylene glycol di(meth)acrylate, polyethylene glycol di(meth)acrylate, propylene glycol di(meth)acrylate, 1,3-butanediol di(meth)acrylate, 1,4-butanediol di(meth)acrylate, neopentyl glycol di(meth)acrylate, 1,6-hexanediol di(meth)acrylate, trimethylolpropane tri(meth)acrylate, pentaerythritol tri(meth)acrylate and pentaerythritol tetra(meth)acrylate. The glycidyl group-containing unsaturated monomer may be, for example, glycidyl (meth)acrylate, allyl glycidyl ether, or 3,4-epoxy-cyclohexylmethyl (meth)acrylate. They are used in combination. Specific examples of the carboxyl-containing unsaturated monomer are (meth)acrylic acid, maleic acid, itaconic acid and fumaric acid.

Examples of the ordinary vinyllic unsaturated monomer that can be used in combination with the above unsaturated monomer having a crosslinkable functional group include vinyl aromatic compounds such a styrene and vinyltoluene; $C_1$–$C_{12}$ alkyl esters of (meth)acrylic acid, such as methyl (meth)acrylate, n-butyl (meth)acrylate, i-butyl (meth)acrylate, t-butyl (meth)acrylate and 2-ethylhexyl (meth)acrylate; $C_2$–$C_6$ hydroxyalkyl esters of (meth)acrylic acid, such as 2-hydroxypropyl (meth)acrylate; (meth)acrylonitrile; (meth)acrylamide; and vinyl acetate. They may be used singly or in combination with each other.

The dispersion-polymerization of the vinyllic unsaturated monomer (C) is carried out in the presence of a polymerization initiator. In addition to the peroxide compounds described above with regard to the graft polymerization of the vinyllic graft alkyd resin (I), azo initiators such as azobisdimethylvaleronitrile and azobisisobutyronitrile may be used as the polymerization initiator.

When a combination of the glycidyl-containing unsaturated monomer and the carboxyl-containing unsaturated monomer is used as the unsaturated monomer having a crosslinkable functional group, it is preferred to use a catalytic amount of a tertiary amine such as tributylamine, dimethylbenzylamine or N,N-dimethylaminoethanol as a crosslinking accelerator.

The organic solvent used in the dispersionpolymerization may be any organic solvents which dissolve the vinyllic graft alkyd resin (I) at least partially, substantially dissolve the vinyllic unsaturated monomer (C) but does not substantially dissolve the resulting polymer of the comonomer (C) and which are selected from those organic solvents exemplified above for use in the graft-polymerization of the modified alkyd resin (A). Mineral spirits, either alone or in combination with a minor proportion of another organic solvent are preferred. Such a mixed solvent desirably contains at least 60% by weight, preferably at least 70% by weight, of the mineral spirits.

The dispersion-polymerization of the vinyllic unsaturated monomer (C) may be carried out by known methods. For example, part or the whole of the vinyllic graft alkyd resin (I) as a dispersion stabilizer and part or the whole of the organic solvent are introduced into a reactor, and stirred and heated. Usually at a reaction temperature of 50° to 150° C., the vinyllic unsaturated monomer (C) and the remainder of the vinyllic graft alkyd resin (I) (if a portion of it has been used), the polymerization initiator and as required, the organic solvent are added dropwise over about 1 to 6 hours, and the mixture is maintained for 1 to 6 hours.

Consequently, an air-drying non-water-dispersible resin composition containing the polymer gel particles insoluble in the organic solvent is obtained.

As required, a vinyllic graft alkyd resin (II) which is to become a continuous phase may be incorporated in the non-water-dispersible resin composition. Such a vinyllic graft alkyd resin (II) should be substantially soluble in the organic solvent used to prepare the resin composition, and may be produced by using the same materials and method as in the production of the vinyllic graft alkyd resin (I). The vinyllic graft alkyd resin (II) may differ from the vinyllic graft alkyd resin (I) in the proportion of the vinyllic unsaturated monomer grafted to the modified alkyd resin. Preferably, the vinyllic monomer is graft-polymerized in an amount of 95 to 20% by weight, preferably 90 to 30% by weight, more preferably 88 to 35% by weight, to 5 to 80% by weight, preferably 10 to 70% by weight, more preferably 12 to 65% by weight, of the modified alkyd resin.

The proportion of the vinyllic graft alkyd resin (II) may generally be not more than 80% by weight, preferably not more than 70% by weight, especially preferably not more than 60% by weight, based on the total solids content of the non-water-dispersible resin composition and the vinyllic graft alkyd resin (II).

The air-drying non-water-dispersible resin so obtained may be used, for example, as a paint composition. Such a paint composition may contain a colored pigment such as titanium white, carbon black, red iron oxide and phthalocyanine blue, an extender pigment such as calcium carbonate, barium sulfate, talc or mica, a dryer such as cobalt, magnesium or manganese naphthenate or octenate, and an antiskinning agent such as methyl ethyl ketone oxime in amounts ordinarily used.

The transparent or colored paint composition comprising the air-drying non-water-dispersible resin composition may be coated once on the surface of a substrate to a predetermined film thickness. Alternatively, it may be coated on the surface of the substrate, and overcoated on the applied coating in a dry condition from immediately after application until it solidifies and dries, preferably to a state of finger touch drying to drying to solidification, and as required repeating overcoating until the predetermined film thickness is attained. There is no particular limitation on the substrate on which the coated film can be formed. For example, it may be concrete, wood, paper, metal, plastics, and coated films. The coating method may be, for example, brush coating, roller coating, spray coating, flow coating and dip coating. The film thickness is selected according to the properties required and the finished appearance desired. Usually, dry film thicknesses of 10 to 60 microns, preferably 15 to 45 microns, will suffice.

The coated film prepared by using the paint composition shows a good balance between the finish and the film properties including gloss, drying property and hardness. The film of the paint composition immediately after coating has a hard surface owing to the vinyl polymer component in the vinyllic graft alkyd resin and its interior is reinforced with the polymer gel particles. Accordingly, multicoat coating does not cause defects such as wrinkling, and the coated film has an excellent finished appearance.

The following Examples illustrate the present invention more specifically. All parts and percentages in these examples are by weight.

EXAMPLE OF PRODUCING AN ALKYD RESIN

A 5-liter flask equipped with a stirrer, a condenser, a thermometer and a $N_2$ gas introducing tube was charged with 397 parts of pentaerythritol, 41 parts of ethylene glycol, 372 parts of phthalic anhydride, 123 parts of tetrahydrophthalic anhydride and 1645 parts of soybean oil fatty acid. While passing $N_2$ gas, refluxing a small amount of xylene and dehydrating the mixture at 240° C., the mixture was reacted for about 7 hours until the acid value of the product reached 8.5. The reaction product was diluted with 246 parts of xylene and 575 parts of mineral spirit to form an alkyd resin having a solids content of 75%, an oil length of 67% and a tetrahydrophthalic anhydride content of 5%.

EXAMPLES OF PRODUCING VINYLLIC GRAFT ALKYD RESINS

Production Example 1

In a 5-liter flask equipped with a stirrer, a condenser, a thermometer and a $N_2$ gas introducing tube, a mixture of the following composition was reacted at 130° C. for 8 hours.

75% alkyd resin above: 1260 parts
Mineral spirits: 950 parts
1-Butyl methacrylate: 1260 parts
Styrene: 840 parts
1-butylperoxy benzoate: 42 parts The reaction product was diluted with 625 parts of mineral spirit to obtain a vinyllic graft alkyd resin (1) having a solids content of 60% and an alkyd/vinyl solids content ratio of 20/80 and containing 60% of t-butyl methacrylate in the vinyl component. The resin had a number average molecular weight of about 30,000.

Production Example 2

In a 5-liter flask equipped with a stirrer, a condenser, a thermometer and a $N_2$ gas introducing tube, a mixture of the following composition was reacted at 130° C. for 8 hours.

75% alkyd resin above: 1750 parts
Mineral spirits: 687 parts
t-Butyl methacrylate: 788 parts
Styrene: 525 parts
t-Butyl peroxybenzoate: 26.3 parts The reaction product was diluted with 625 parts of mineral spirits to give a vinyllic graft alkyd resin (2) having a solids content of 60% and an alkyd/vinyl solid content ratio of 50/50 and containing 60% of t-butyl methacrylate in the vinyl component. The resulting vinyllic graft alkyd resin (2) had a number average molecular weight of about 32,000.

Production Example 3

Production Example 1 was repeated except that 1890 parts of t-butyl methacrylate and 210 parts of i-butyl methacrylate were used instead of 260 parts of t-butyl methacrylate and 840 parts of styrene. There was obtained a vinyllic graft alkyd resin (3) having a solids content of 60% and an alkyd/vinyl solids content ratio of 20/80 and containing 90% of t-butyl methacrylate in the vinyl component. It had a molecular weight of about 31,000.

Production Example 4

Production Example 1 was repeated except that i-butyl methacrylate was used instead of t-butyl methacrylate. There was obtained a vinyllic graft alkyl resin (4) having a solids content of 60% and an alkyd/ vinyl solids content ratio of 20/80 and containing 60% of i-butyl methacrylate in the vinyl component. It had a number average molecular weight of about 30,000.

Production Example 5

In a 5-liter flask equipped with a stirrer, a condenser, a thermometer and an $N_2$ gas introducing tube, a mixture of the following composition was reacted at 130° C. for 8 hours.

75% alkyd resin: 2800 parts
Mineral spirits: 425.5 parts
t-Butyl methacrylate: 315 parts
Styrene: 210 parts
t-Butyl peroxybenzoate: 10.5 parts The reaction product was diluted with 624.5 parts of mineral spirits to give a vinyllic graft alkyd resin (5) having a solids content of 60% and an alkyd/ vinyl solids contentration of 80/20 and containing 60% of t-butyl methacrylate in the vinyl component. It had a number average molecular weight of about 15,000.

Production Example 6

Production Example 1 was repeated except that n-butyl methacrylate was used instead of t-butyl methacrylate. There was obtained a vinyllic graft alkyd resin (6) having a solids content of 60% and an alkyd/vinyl solids content ratio of 20/80 and not containing t-butyl methacrylate nor i-butyl methacrylate in the vinyl component.

EXAMPLE OF PRODUCING A NON-WATER-DISPERSIBLE RESIN SOLUTION (1)

The same 5-liter flask as used in Production Example 1 was charged with 834 parts of 60% vinyllic graft alkyd resin (1) and 654 parts of mineral spirits, and the temperature was elevated to 90° C. A mixture of the following composition was added dropwise over 8 hours.

Methyl acrylate: 358 parts
Styrene: 142 parts
Acrylonitrile: 71 parts
2-Hydroxyethyl acrylate: 142 parts
1,6-Hexanediol diacrylate: 37.5 parts
1-Butyl peroxy-2-ethylhexanoate: 7.5 parts
iso-Propanol: 37.5 parts
Mineral spirits: 113 parts.

The reaction product was diluted with 113 parts of mineral spirits to give a non-water-dispersible resin (1) having a solids content of 50% and dispersion stabilizer/dispersed particle solids content ratio of 40/60. This resin had an average particle diameter of 0.3 micrometer, a Gardner viscosity of CD and good storage stability. It did not contain coarse particles.

EXAMPLES OF PRODUCING OF NON-WATER-DISPERSIBLE RESIN SOLUTIONS (2) to (6)

Non-water-dispersible resins (2) to (6) having a solids content of 50% were obtained by repeating the above example of producing the non-water-dispersible resin solution (1) except that vinyllic graft alkyd resins (2), (3), (4), (5) and (6) were used instead of the vinyllic graft alkyd resin (1). These resulting resin had an average particle diameter of 0.21 to 0.4 micrometer.

EXAMPLE OF PRODUCING A NON-WATER DISPERSIBLE RESIN SOLUTION (7)

The same 5-liter flask as used in Production Example 1 was charged with 834 parts of 60% vinyllic graft alkyd resin (1) and 654 parts of mineral spirit, and the temperature was elevated to 90° C. A mixture of the following composition was reacted for 8 hours.

Methyl acrylate: 375 parts
Styrene: 150 parts
Acrylonitrile: 75 parts
2-Hydroxyethyl acrylate: 150 parts
t-butylperoxy-2-ethylhexanoate: 7.5 parts
iso-Propanol: 37.5 parts
Turpene: 113 parts The resulting reaction product was diluted with 113 parts of mineral spirits to form a non-water-dispersible resin solution (7) having a solids content of 50%, a solids content ratio of dispersion stabilizer/dispersed particle of 40/60 and an average particle diameter of 0.35 micrometer.

The vinyllic graft alkyd resins (1) to (6) and the non-water-dispersible resin solutions (1) to (7) were blended in the solids blending ratio shown in Table 1, and 3 parts of lead naphthenate and 1 part of cobalt naphthenate were added to the blend as dryers, and the resulting compositions were tested as follows.

TABLE 1

|  |  | Example | | | | | | | Comparative Example | | | |
|---|---|---|---|---|---|---|---|---|---|---|---|---|
|  |  | 1 | 2 | 3 | 4 | 5 | 6 | 7 | 1 | 2 | 3 | 4 |
| Vinyllic | (1) |  | 10 | 30 |  |  |  |  | 90 |  |  | 30 |
| graft alkyd | (2) |  |  |  | 30 |  |  |  |  |  |  |  |
| resin (solids) | (3) |  |  |  |  | 30 |  |  |  |  |  |  |
|  | (4) |  |  |  |  |  | 30 |  |  |  |  |  |
|  | (5) |  |  |  |  |  |  | 30 |  | 30 |  |  |
|  | (6) |  |  |  |  |  |  |  |  |  | 30 |  |
| Non-water- | (1) | 100 | 90 | 70 |  |  |  | 70 | 10 |  |  |  |
| dispersible | (2) |  |  |  | 70 |  |  |  |  |  |  |  |
| resin solution | (3) |  |  |  |  | 70 |  |  |  |  |  |  |
| (solids) | (4) |  |  |  |  |  | 70 |  |  |  |  |  |
|  | (5) |  |  |  |  |  |  |  |  | 70 |  |  |
|  | (6) |  |  |  |  |  |  |  |  |  | 70 |  |
|  | (7) |  |  |  |  |  |  |  |  |  |  | 70 |
| Viscosity of the varnish |  | CD | FG | I | H | J | H | H | UV | G | G | I |

TABLE 1-continued

|  | Example |  |  |  |  |  |  | Comparative Example |  |  |  |
|---|---|---|---|---|---|---|---|---|---|---|---|
|  | 1 | 2 | 3 | 4 | 5 | 6 | 7 | 1 | 2 | 3 | 4 |
| (solids 50%) |  |  |  |  |  |  |  |  |  |  |  |

TABLE 2

|  | Example |  |  |  |  |  |  | Comparative Example |  |  |  |
|---|---|---|---|---|---|---|---|---|---|---|---|
|  | 1 | 2 | 3 | 4 | 5 | 6 | 7 | 1 | 2 | 3 | 4 |
| Storage stability | Good | Good | Good | Good | Good | Good | Good | Good | Good | Good | Good |
| Drying property (finger touch) | 20 | 25 | 30 | 35 | 25 | 35 | 35 | 50 | 150 | 60 | 40 |
| Multicoatability | O | O | O | O | O | O | O | O | X | O | O |
| Gloss | O | O | O | O | O | O | O | O | O | O | O |
| Pencil hardness | 2H | 2H | H | HB | 2H | HB | HB | H | 2B | 4B | H |
| Du Pont Impact (300 g-½ inch) cm | 45 | 45 | 50 | 50< | 45 | 50 | 50< | 50 | 50< | 50< | 50 |
| Gel fraction (%) | 71 | 69 | 48 | 61 | 49 | 47 | 62 | 16 | 71 | 44 | 10 |

Testing Method

Storage stability

The composition was stored at room temperature for 3 months in a closed condition. The degrees of thickening and precipitate formation were evaluated.

Drying property

Measured in accordance with JIS K-5400.

Gloss

The gloss of the surface of the coated film was visually observed. ○ : good

Pencil hardness

Measured in accordance with JIS K-5400.

Multicoatability

Each of the paint compositions in Examples and Comparative Examples was coated on a glass plate to a wet film thickness of 100, 200, 300, 400 and 500 micrometers, respectively. Then the same paint composition was overcoated every four hours after a drying time of 2 to 74 hours at room temperature (20° C.), and every 8 hours after a drying time of 74 hours to 170 hours. After drying at 20° C. for 1 week, wrinkling on the surface of the coated film was observed visually. The evaluation was made on the following standards.

○ : good
◎ : very slight wrinkling
◯ : wrinkling
α: much wrinkling
X: marked occurrence of wriking Gel fraction The paint composition was applied to a glass plate and dried at room temperature for one week. The coating was peeled off from the glass plate, and extracted with acetone by a Soxhlet extractor for more than 8 hours, and then dried. The gel fraction was calculated in accordance with the following equation.

$$\frac{\text{(weight of the coated film after extraction)}}{\text{(weight of the coated film before extraction)}} \times 100$$

We claim:

1. An air-drying non-water-dispersible resin composition obtained by dispersion-polymerization of at least one vinyllic unsaturated monomer (C) in the presence of a vinyllic graft alkyd resin (I) as a dispersion stabilizer in an organic solvent in which at least a part of the vinyllic graft alkyd resin (I) is soluble, the vinyllic unsaturated monomer (C) is substantially soluble but the resulting polymer gells are substantially insoluble, wherein the vinyllic graft alkyd resin (I) is obtained by graft copolymerizing 10 to 70% by weight of a modified alkyd resin (A) having an oil length in the range of 30 to 80% obtained by modification with at least one material selected from drying oils, semi-drying oils, drying oil fatty acids and semi-drying oil fatty acids with 90 to 30% by weight of at least one vinyllic monomer (B) at least 30% of the vinyl monomer (B) being composed of a vinyllic unsaturated monomer (B-1) having an SP value of not greater than 8.25 and a glass transition temperature of at least 20 1 ° C.

2. The composition of claim 1 in which the modified alkyd resin (A) is obtained by using an alicyclic polybasic acid and an alicyclic polyhydric alcohol in a total amount of 1 to 30% by weight based on the total amount of the starting acid and alcohol components.

3. The composition of claim 1 in which the modified alkyd resin has an oil length of 50 to 70% by weight.

4. The composition of claim 1 in which the vinyllic unsaturated monomer (B-1) has an SP value of not more than 8.15 and a glass transition temperature of at least 50° C.

5. The composition of claim 1 in which the vinyllic monomer contains at least 50% by weight of the vinyllic unsaturated monomer (B-1).

6. The composition of claim 1 in which the vinyllic unsaturated monomer (B-1) is isobutyl methacrylate or tert-butyl methacrylate.

7. The composition of claim 1 in which the vinyllic monomer (B) is graft-polymerized in an amount of 88 to 35% by weight with 12 to 65% by weight of the modified alkyd resin (A).

8. The composition of claim 1 in which the vinyllic graft alkyd resin (I) has a number average molecular weight in the range of 3,000 to 300,000.

9. The composition of claim 1 in which the vinyllic unsaturated monomer (C) contains 1 to 20% by weight of a crosslinking polymerizable unsaturated monomer.

10. The composition of claim 9 in which the crosslinking polymerizable unsaturated monomer is a polyfunctional monomer having at least two polymerizable double bonds per molecule or a combination of a vinyllic unsaturated monomer containing a glycidyl group and a vinyllic unsaturated monomer containing a carboxyl group.

11. The composition of claim 1 in which the vinyllic unsaturated monomer (C) is used in an amount of 25 to 900 parts by weight per 100 parts by weight of the vinylic graft alkyd resin (I).

12. The composition of claim 1 in which the organic solvent contains mineral spirits as a main component.

13. The composition of claim 1 which further comprises in a continuous phase a vinyllic graft alkyd resin (II) obtained by graft copolymerizing 95 to 20 parts by weight of the vinyllic monomer (B) with 5 to 80% by weight of the modified alkyd resin (A).

14. The composition of claim 13 in which the amount of the vinyllic graft alkyd resin (II) is up to 80% by weight of the total solids content.

15. A paint composition comprising the composition of claim 1.

* * * * *